US011006615B1

(12) United States Patent
Xu et al.

(10) Patent No.: US 11,006,615 B1
(45) Date of Patent: May 18, 2021

(54) MULTIFUNCTIONAL PET FEEDING CART

(71) Applicant: SHENZHEN LEBEN TECHNOLOGY CO., LTD., Shenzhen (CN)

(72) Inventors: Xun Xu, Shenzhen (CN); Zhiping Liu, Shenzhen (CN)

(73) Assignee: SHENZHEN LEBEN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/008,584

(22) Filed: Aug. 31, 2020

(30) Foreign Application Priority Data

Aug. 21, 2020 (CN) ........................ 202010851233.8

(51) Int. Cl.
*A01K 5/02* (2006.01)
*G05D 1/02* (2020.01)
(Continued)

(52) U.S. Cl.
CPC .............. *A01K 5/0266* (2013.01); *A01K 5/01* (2013.01); *A01K 5/0114* (2013.01); *A01K 5/0233* (2013.01); *A01K 5/0291* (2013.01); *G05D 1/0238* (2013.01); *G05D 1/0242* (2013.01); *G05D 1/0246* (2013.01); *A01K 39/014* (2013.01)

(58) Field of Classification Search
CPC ...... A01K 5/0266; A01K 5/01; A01K 5/0114; A01K 5/0233; A01K 5/0291; A01K 39/014
See application file for complete search history.

(56) References Cited

U.S. PATENT DOCUMENTS

| | | | | |
|---|---|---|---|---|
| 8,707,900 B1 * | 4/2014 | Womble | ............... | A01K 15/025 119/51.5 |
| 8,919,285 B1 * | 12/2014 | Chambers | ............ | A01K 5/0266 119/57.92 |

(Continued)

FOREIGN PATENT DOCUMENTS

| | | | |
|---|---|---|---|
| CA | 2674158 A1 * | 2/2010 | ........... A01K 5/0266 |
| CA | 2872427 A1 * | 5/2015 | ........... A01K 5/0266 |

(Continued)

*Primary Examiner* — Monica L Barlow
*Assistant Examiner* — Aaron M Rodziwicz

(57) ABSTRACT

The present disclosure provides a multifunctional pet feeding cart, including a body assembly, a feeding assembly, a multifunctional control assembly, a drive assembly, and a camera assembly. The feeding assembly, the multifunctional control assembly, the drive assembly, and the camera assembly are disposed inside the body assembly, and the multifunctional control assembly is respectively and electrically connected with the feeding assembly, the drive assembly, and the camera assembly. The multifunctional control assembly includes a multifunctional module and an identification module. The multifunctional module is electrically connected with the identification module. The multifunctional control module includes a control mainboard, a battery, a power switch, a feeding circuit board, a card slot, and a charging connector. The battery, the power switch, the feeding circuit board, the card slot, and the charging connector are electrically connected with the control mainboard.

7 Claims, 4 Drawing Sheets

24
23
19
7
1
27
8
28
6

(51) Int. Cl.
*A01K 5/01* (2006.01)
*A01K 39/014* (2006.01)

(56) References Cited

U.S. PATENT DOCUMENTS 10,729,100 B2 * 8/2020 Christiansen .......... G08G 1/017
2006/0118054 A1 * 6/2006 Rousseau ............. A01K 5/0266 119/57.1
2010/0230183 A1 * 9/2010 Van Den Berg ..... A01K 5/0266 180/6.48
2013/0327276 A1 * 12/2013 Trantina ............... A01K 5/0266 119/57.92
2015/0250137 A1 * 9/2015 Palsgaard ................. B60P 1/00 119/57.92
2016/0023867 A1 * 1/2016 Posthumus ......... B01F 15/0222 366/150.1
2017/0223926 A1 * 8/2017 Ausman ............... A01K 11/006
2017/0238503 A1 * 8/2017 Deritis ................. A01K 5/0275
2017/0360014 A1 * 12/2017 Hall ..................... G05D 1/0219
2018/0303062 A1 * 10/2018 Simard ................ A01K 15/021
2020/0037579 A1 * 2/2020 Eom ...................... A01K 5/025
2020/0178505 A1 * 6/2020 Womble ................ A01M 29/00
2020/0359597 A1 * 11/2020 Hassan ..................... B62B 1/18

FOREIGN PATENT DOCUMENTS

CA 2947839 A1 * 11/2015 ........... A01K 5/0266
CA 2996495 A1 * 3/2017 ........... A01K 5/0266
CA 2983986 A1 * 12/2017 ............. A01K 1/105
DE 202013001659 U1 * 5/2014 ........... A01K 5/0266
DE 202017104377 U1 * 10/2018 ............. A01K 5/001
JP 3740156 B1 * 2/2006 ........... A01K 5/0266
WO WO-2016036711 A1 * 3/2016 ........... A01K 5/0114

* cited by examiner

MULTIFUNCTIONAL PET FEEDING CART

TECHNICAL FIELD

The present disclosure relates to a pet feeder, in particular to a multifunctional pet feeding cart.

BACKGROUND

As spiritual requirements of people continue to increase, more and more people choose to raise pets. Feeding the pets is necessary for raising the pets, and many people choose to purchase automatic feeders to automatically feed the pets. At present, the automatic feeders in the markets feed the pets by putting pet feed into the feeders at a regular time, thus making it easy to place too much of the pet feed in the feeders, which placing the pet feed in the feeders causes food pollution and waste. Moreover, the automatic feeders are set in a fixed position, which is unable to move and also unable to interact with the pets.

SUMMARY

The present disclosure aims at providing a multifunctional pet feeding cart to interact with pets.

In order to achieve object above, the present disclosure provides the multifunctional pet feeding cart, including a body assembly, a feeding assembly, a multifunctional control assembly, a drive assembly, and a camera assembly. The feeding assembly, the multifunctional control assembly, the drive assembly, and the camera assembly are disposed inside the body assembly, and the multifunctional control assembly is respectively and electrically connected with the feeding assembly, the drive assembly, and the camera assembly. The multifunctional control assembly includes a multifunctional control module and an identification module. The multifunctional control module is electrically connected with the identification module. The multifunctional control module includes a control mainboard, a battery, a power switch, a feeding circuit board, a card slot, and a charging connector. The battery, the power switch, the feeding circuit board, the card slot, and the charging connector are electrically connected with the control mainboard. A mobile network module, a WIFI module, a BLUETOOTH module, an infrared remote module, and a charging circuit module are integrated on the control mainboard. The card slot is disposed on the mobile network module. The charging connector is electrically connected with the charging circuit module. The camera assembly includes a connecting circuit board, a camera, and a plurality of infrared lamps. The camera is disposed on the connecting circuit board, and the plurality of the infrared lamps are disposed around the camera. The connecting circuit board is electrically connected with the control mainboard.

Furthermore, the body assembly includes a body frame, a front shell, a surface shell, a bin cover, and a cover opening locking buckle. The surface shell is disposed on the body frame, and the body frame is fixedly connected with the front shell; the feeding bin is disposed on the surface shell. The surface shell is hinged to the bin cover, and the bin cover is located above the feeding bin. The cover opening locking buckle is disposed on the surface shell, and the cover opening locking buckle is buckled with a buckle disposed on the bin cover. A lens is disposed on the surface shell, and the lens is coordinated and matched with a position where the camera and the plurality of the infrared lamps are disposed.

Furthermore, the identification module includes two infrared sensors configured to detect obstacles, the two infrared sensors are electrically connected with the control mainboard. The two infrared sensors are symmetrically disposed on the front shell.

Furthermore, the control mainboard is disposed inside the body frame. The power switch, the card slot, and the charging connector are disposed on an outer wall of the body frame, the feeding circuit board is disposed on an inner wall of the surface shell, and the feeding circuit board is connected with a feeding button. The feeding button is disposed on the surface shell and is disposed below the cover bin.

Furthermore, the feeding assembly includes a feeding motor, a trough, a feeding channel, a food-outputting component, a food-delivering component, and a feeding bin. The trough is disposed inside the body frame. The feeding motor is fixedly disposed on a bottom of the trough. An output shaft of the feeding motor is inserted into the trough, the output shaft of the feeding motor is connected with the food-outputting component by a button, and the food-outputting component is located inside the trough. The output shaft of the feeding motor is connected with the food-delivering component by a button, and the food-delivering component is located above the food-outputting component. The food-delivering component is located inside the feeding bin, and the feeding bin is located directly above the trough. The food-outputting component is located below the feeding bin, and a food-outputting opening is disposed on a bottom of the feeding bin.

Furthermore, the food-delivering component is composed of two food-pushing plates, an angle formed by any one of the two food-pushing plates and the bottom of the feeding bin is an acute angle.

Furthermore, the food-outputting component is composed of a plurality of food-scraping plates, the plurality of the food-scraping plates evenly surround the output shaft of the feeding motor. The food-scraping plates are perpendicular to and distributed on the bottom of the trough.

Furthermore, the drive assembly includes a drive motor set, two gear driving shafts, two drive wheels, and a universal wheel. The drive motor set is disposed inside the body frame. The drive motor set includes two drive motors and two gear driving sets, the two drive motors are connected with the two gear driving sets. The two drive wheels are respectively disposed on two sides of the body frame. The two drive wheels are connected with the body frame by the gear driving shafts. The gear driving shafts are rotatably connected with the body frame. The gear driving shafts are in meshing connection with the gear driving sets. The universal wheel is disposed on a bottom of the body frame, and the universal wheel and the two drive wheels are distributed in a triangular shape.

Working principles and advantages of the present disclosure are as followings.

The multifunctional pet feeding cart is controlled to operate by the multifunctional control module, thus, there are multiple control methods to control the multifunctional pet feeding cart. The multifunctional pet feeding cart stirs pet feed by the feeding assembly and feeds pets in small amounts and multiple times. The multifunctional pet feeding cart is further driven by the drive assembly and the multifunctional control assembly and then keeps interacting with the pets. Users monitor motions of pets at any time and are convenient to remotely control the multifunctional pet feeding cart by the camera module, and then feed the pets. Thus, the pets have enough exercise and more easily eat up the pet feed in the intelligent pet feeding cart, which greatly decreases a risk of food waste.

DETAILED DESCRIPTION

Figure 1:
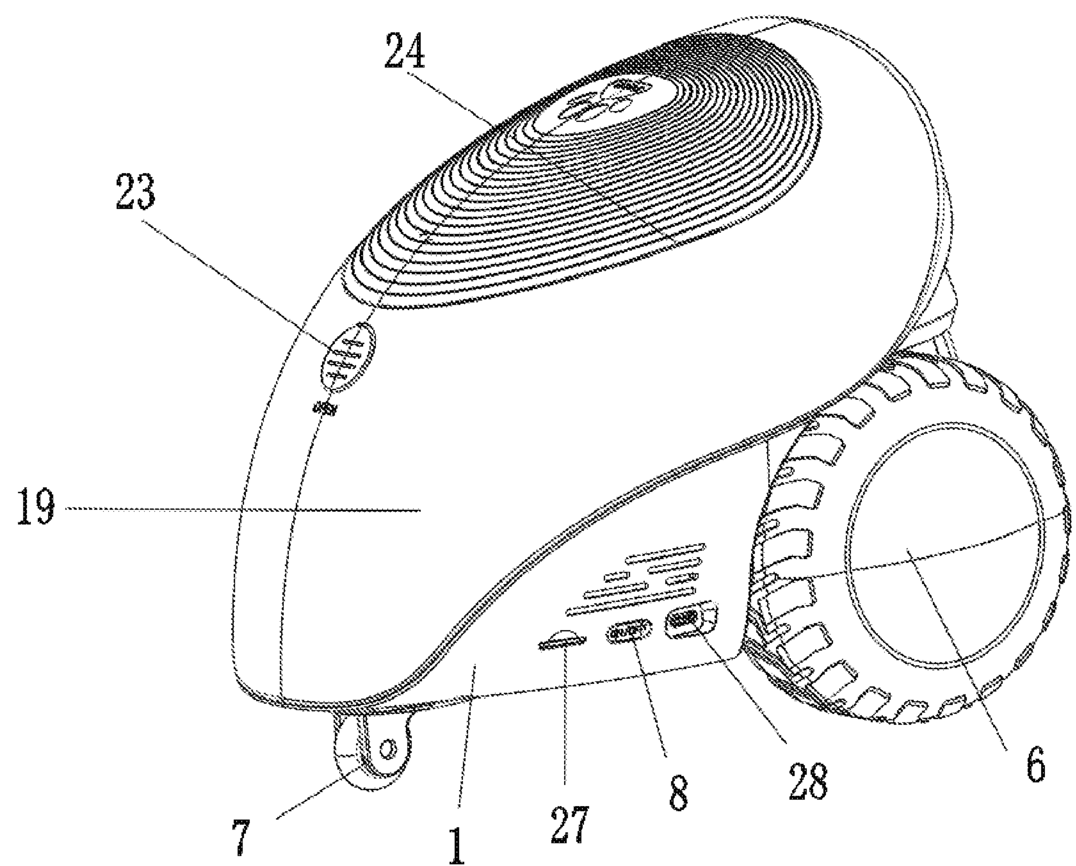
FIG. 1 is a perspective diagram of a multifunctional pet feeding cart of the present disclosure.

Detailed description of the present disclosure are described below according to embodiments.

Reference numerals in the drawings include:

1. body frame; 2. control mainboard; 3. battery; 4. drive motor set; 5. gear driving shafts; 6. drive wheels; 7. universal wheel; 8. power switch; 9. front shell; 10. infrared sensors; 11. camera; 12. infrared lamps; 13. lens; 14. feeding motor; 15. trough; 16. feeding channel; 17. food-outputting component; 18. food-delivering component; 19. surface shell; 20. feeding bin; 21. feeding circuit board; 22. feeding button; 23. cover opening locking buckle; 24. bin cover; 25. food-outputting opening; 26. connecting circuit board; 27. card slot; 28. charging connector.

The specific implementation procedure is as follows:

As shown in FIGS. 1-4, the present disclosure provides a multifunctional pet feeding cart, including a body assembly, a feeding assembly, a multifunctional control assembly, a drive assembly, and a camera assembly. The feeding assembly, the multifunctional control assembly, the drive assembly, and the camera assembly are disposed inside the body assembly, and the multifunctional control assembly is respectively and electrically connected with the feeding assembly, the drive assembly, and the camera assembly. The multifunctional control assembly includes a multifunctional control module and an identification module. The multifunctional control module is electrically connected with the identification module. The multifunctional control module includes a control mainboard 2, a battery 3, a power switch 8, a feeding circuit board 21, a card slot 27, and a charging connector 28. The battery 3, the power switch 8, the feeding circuit board 21, the card slot 27, and the charging connector 28 are electrically connected with the control mainboard. A mobile network module, a WIFI module, a BLUETOOTH module, an infrared remote module, and a charging circuit module are integrated on the control mainboard 2. The card slot 27 is disposed on the mobile network module. The charging connector 28 is electrically connected with the charging circuit module. The camera assembly includes a connecting circuit board 26, a camera 11, and a plurality of infrared lamps 12. The camera 11 is disposed on the connecting circuit board 26, and the plurality of the infrared lamps 12 are disposed around the camera 11. The connecting circuit board 26 is electrically connected with the control mainboard 2.

The body assembly forms a basic frame and an outer shell of the multifunctional pet feeding cart, which is configured to support and protect other components of the multifunctional pet feeding cart. The feeding assembly is configured to automatically put pet feed in. The drive assembly is a power source of the multifunctional pet feeding cart, which drives the multifunctional pet feeding cart move freely. The multifunctional control assembly adopts multiple control methods to control the multifunctional pet feeding cart to move. The control mainboard 2 is mainly composed of a single-chip microcomputer controller and other related circuit electrical components. The battery 3 supplies necessary electric energy for the intelligent pet feeding cart, and the power switch 8 is configured to control an on-off of a main circuit of the intelligent pet feeding cart. The feeding circuit board 21 is configured to generate a feeding signal and is used in conjunction with the feeding button 22. The mobile network module is configured to read information of a network card and is configured to exchange the information with the Internet, so that the multifunctional pet feeding cart is connected with mobile network. The card slot 27 is configured to install the mobile network card. The WIFI module establishes a wireless local area network, so that a mobile terminal, of a mobile phone or the like, accesses the wireless local area network, then users control the multifunctional pet feeding cart by corresponding mobile phone software. The BLUETOOTH module is preferably a BLUETOOTH 4.0 module. The mobile terminal is connected with the multifunctional pet feeding cart in BLUETOOTH by the BLUETOOTH module, so that the multifunctional pet feeding cart is controlled by the mobile terminal. The infrared remote module is matched with a remote controller. The users control the multifunctional pet feeding cart by the remote controller, the charging circuit board is matched with the charging connector, which is configured to charge the battery 3 of the multifunctional pet feeding cart. The camera module is configured to shoot views in front of the multifunctional pet feeding cart, and the camera 11 transmits the views in front of the multifunctional pet feeding cart to the mobile terminal, which is convenient for the users to check what the pets are doing. The plurality of the infrared lamps 12 are configured to light, which helps the camera 11 shoot clear views at night or under a condition of insufficient light. Meanwhile, lights emitted by the plurality of the infrared lamps 12 attract attention of the pets so that the pets catch the multifunctional pet feeding cart. The connecting circuit board 26 is configured to install the camera 11 and the infrared lamps 12.

Figure 2:
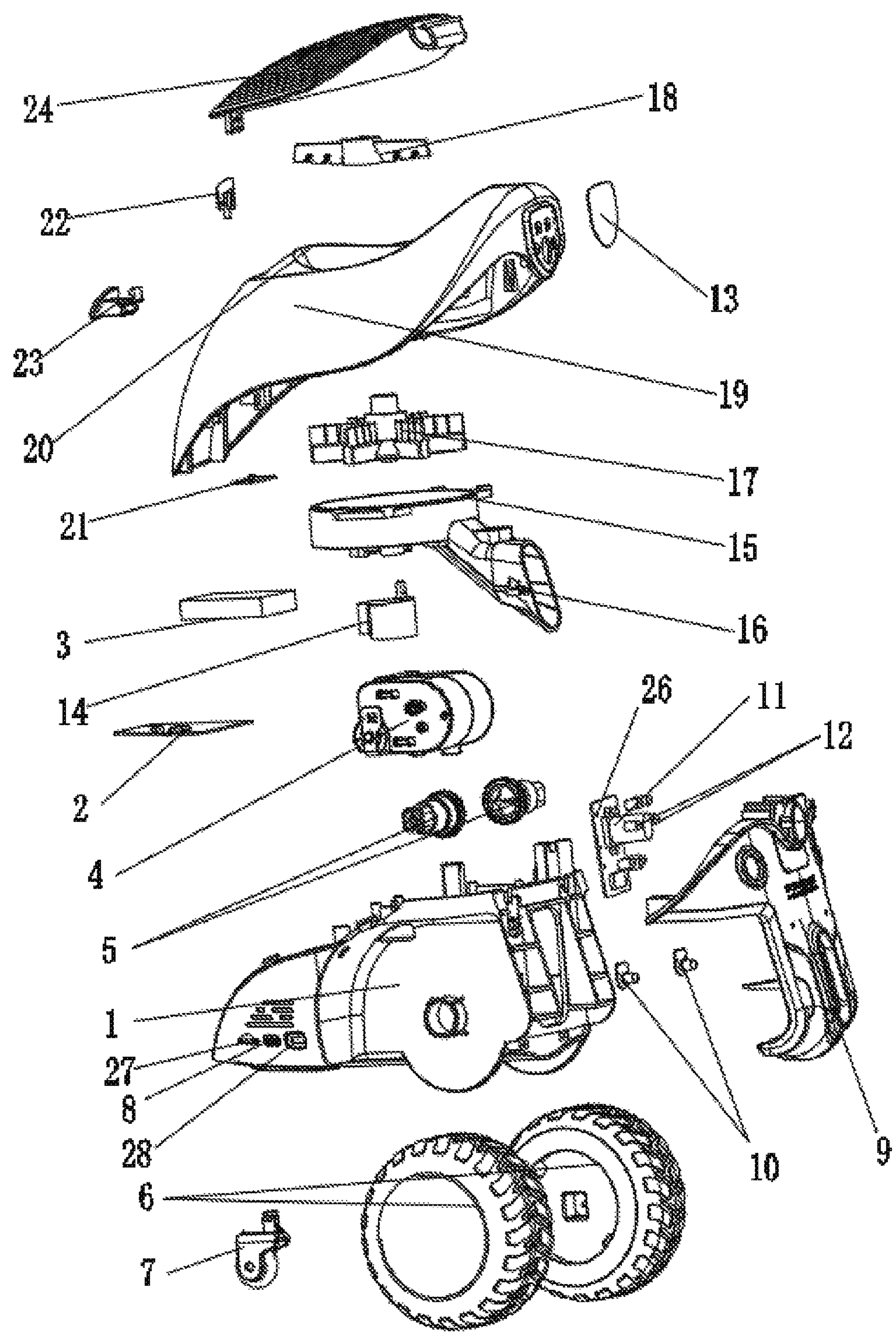
FIG. 2 is a structural schematic diagram of the multifunctional pet feeding cart of the present disclosure.

As shown in FIG. 2, the body assembly includes a body frame 1, a front shell 9, a surface shell 19, a bin cover 24, and a cover opening locking buckle 23. The surface shell 19 is disposed on the body frame 1, and the body frame 1 is fixedly connected with the front shell 9. The feeding bin 20 is disposed on the surface shell 19. The surface shell 19 is hinged to the bin cover 20, and the bin cover 24 is located above the feeding bin 20. The cover opening locking buckle 23 is disposed on the surface shell 19, and the cover opening locking buckle 23 is buckled with a buckle disposed on the bin cover 24. A lens 13 is disposed on the surface shell 19, and the lens 13 is coordinated and matched with a position where the camera 11 and the plurality of the infrared lamps 12 are disposed.

The body frame 1 is a basic supporting frame of the intelligent pet feeding cart, the front shell 9 is a decorative component, the surface shell 19 is configured to dispose the feeding bin 20 and the bin cover 24. The cover opening locking buckle 23 is a common spring buckle, and the cover opening locking buckle 23 is used in conjunction with the buckle disposed on the bin cover 24, which is convenient to open or close the feeding bin, and convenient for people to add the pet feed into the feeding bin 20.

As shown in FIG. 2, the identification module includes two infrared sensors 10 configured to detect obstacles, the two infrared sensors are electrically connected with the control mainboard 2. The two infrared sensors 10 are symmetrically disposed on the front shell 9.

The infrared sensors 10 are configured to detect the obstacles in front of the intelligent pet feeding cart, so that the intelligent pet feeding cart actively avoids the obstacles. The infrared sensors 10 are common infrared obstacle avoidance sensors sold in the market.

Figure 4:
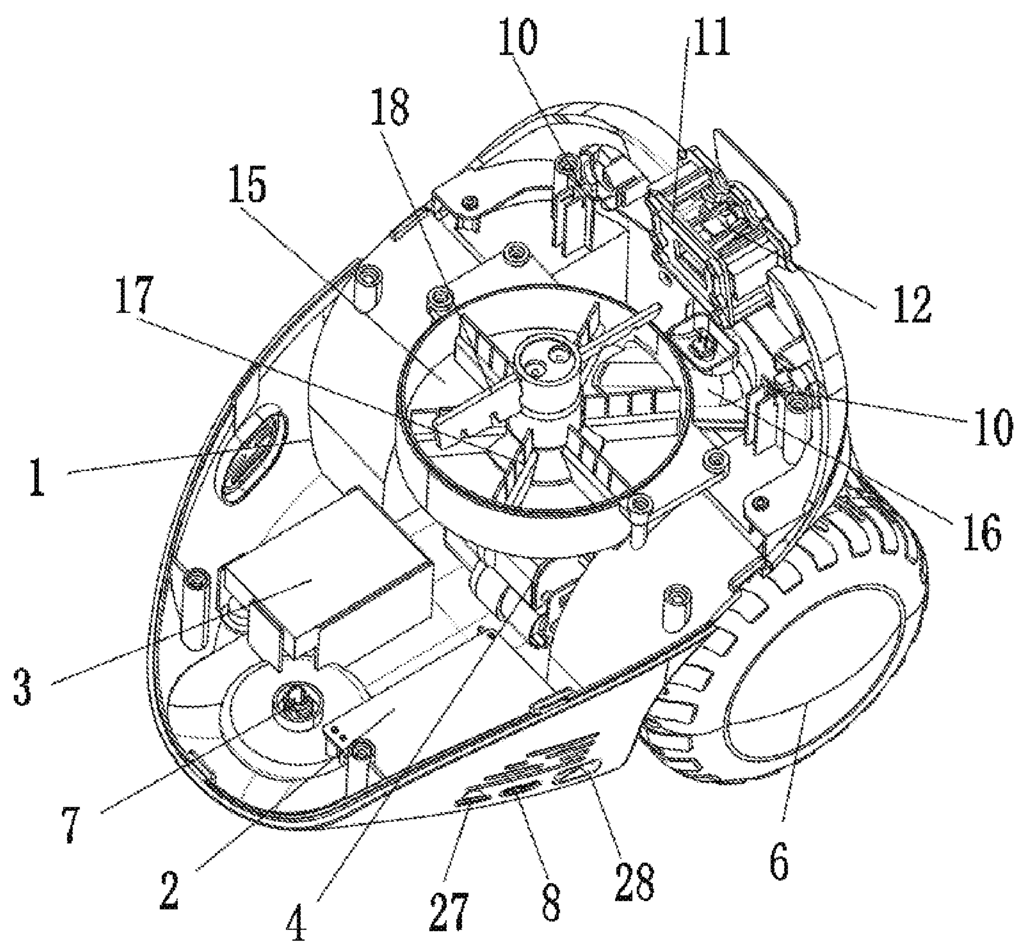
FIG. 4 is an inner structural schematic diagram of the intelligent pet feeding cart of the present disclosure.

As shown in FIG. 4, the control mainboard 2 is disposed inside the body frame 1. The power switch 8, the card slot 27, and the charging connector 28 are disposed on an outer wall of the body frame 1, the feeding circuit board 21 is disposed on an inner wall of the surface shell 19, and the feeding circuit board 21 is connected with a feeding button 22. The feeding button 22 is disposed on the surface shell 19 and is disposed below the cover bin 24.

Figure 3:
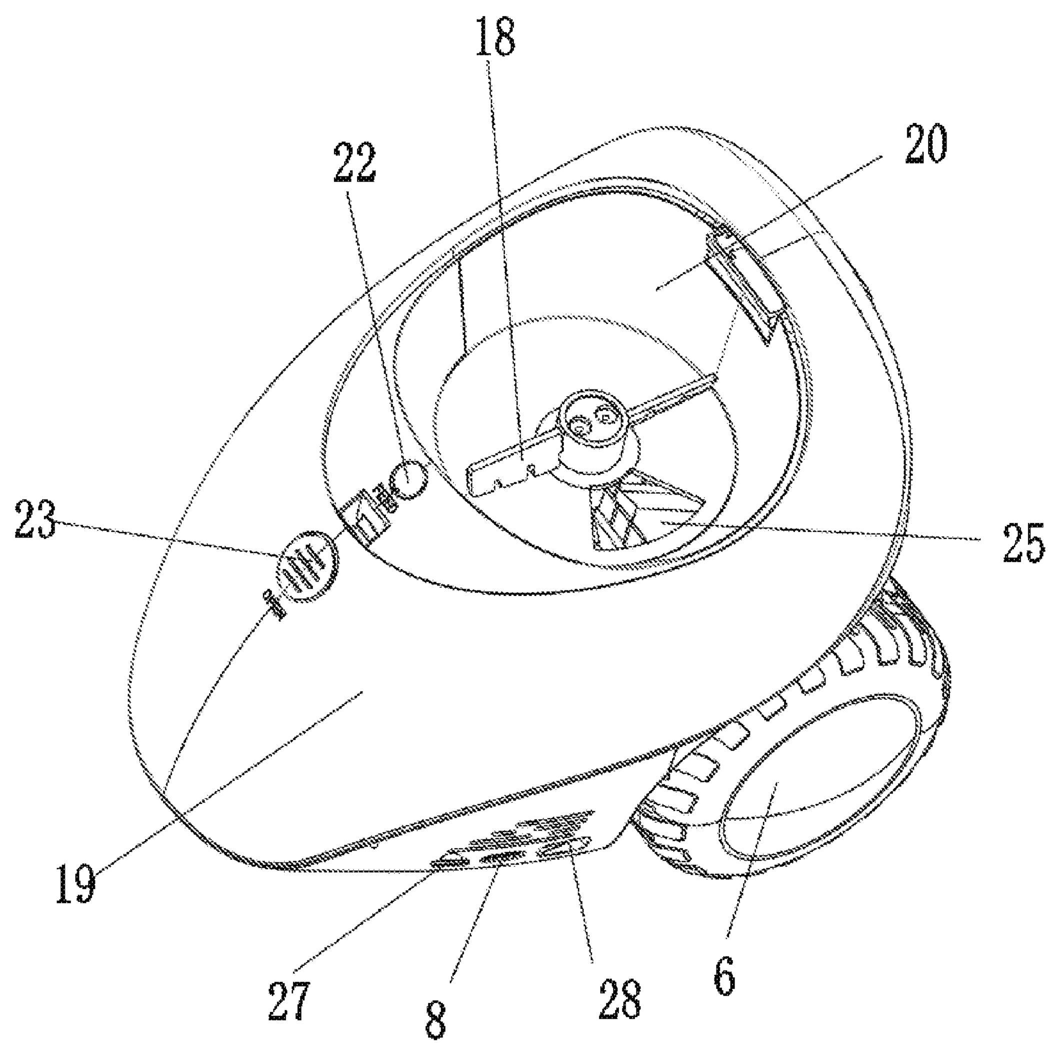
FIG. 3 is a structural schematic diagram of a feeding bin of the present disclosure.

As shown in FIG. 3-4, the feeding assembly includes a feeding motor 14, a trough 15, a feeding channel 16, a food-outputting component 17, a food-delivering component 18, and a feeding bin 20. The trough 15 is disposed inside the body frame 1. The feeding motor 14 is fixedly disposed on a bottom of the trough 15. An output shaft of the feeding motor 14 is inserted into the trough 15, the output shaft of the feeding motor 14 is connected with the food-outputting component 17 by a button, and the food-outputting component 17 is located inside the trough 15. The output shaft of the feeding motor 14 is connected with the food-delivering component 18 by a button, and the food-delivering component 18 is located above the food-outputting component 17. The food-delivering component 18 is located inside the feeding bin 20, and the feeding bin 20 is located directly above the trough 15. The food-outputting component 17 is located below the feeding bin 20, and a food-outputting opening 15 is disposed on a bottom of the feeding bin 20.

The feeding bin 20 of the feeding assembly is configured to store the pet feed. Size of the feeding bin 20 is various, and the intelligent pet feeding carts with different sizes are chose according to the pets with different sizes, so that a amount of the pet feed in one feeding bin 20 is nicely enough for the pets to eat. The food-delivering component 18 is configured to push the pet feed stored in the feeding bin 20 from the feeding opening 25 into the trough 15. The food-outputting component 17 divides the rough 15 into a plurality of equal spaces, the pet feed falls from the feeding bin 20 into the rough 15 and is distributed into the plurality of the equal spaces of the trough 15. Then the food-outputting component 17 delivers the pet feed to outside through the feeding channel 16. The feeding motor 14 is configured to drive the food-delivering component 18 and food-outputting component 17 to rotate.

As shown in FIG. 3, the food-delivering component 18 is composed of two food-pushing plates, an angle formed by any one of the two food-pushing plates and the bottom of the feeding bin 20 is an acute angle.

The food-delivering component 18 is composed of the two food-pushing plates and is configured to deliver the pet feed stored in the feeding bin 20 to the feeding opening 25. The angle formed by any one of the two food-pushing plates and the bottom of the feeding bin 20 is the acute angle, which is convenient for pushing the pet feed when the feeding bin 29 is full to avoid the pet feed from blocking the feeding opening 25.

As shown in FIG. 4, the food-outputting component 17 is composed of a plurality of food-scraping plates, the plurality of the food-scraping plates evenly surround the output shaft of the feeding motor 14. The food-scraping plates are perpendicular to and distributed on the bottom of the trough 15.

The trough 15 is divided into a plurality of the equal spaces by the food-scraping plates which compose the food-outputting component 17.

As shown in FIG. 4, the drive assembly includes a drive motor set 4, two gear driving shafts 5, two drive wheels 6, and a universal wheel 7. The drive motor set 4 is disposed inside the body frame 1. The drive motor set 4 includes two drive motors and two gear driving sets, the two drive motors are connected with the two gear driving sets. The two drive wheels 6 are respectively disposed on two sides of the body frame 1. The two drive wheels 6 are connected with the body frame 1 by the gear driving shafts 5. The gear driving shafts 5 are rotatably connected with the body frame 1. The gear driving shafts 5 are in meshing connection with the gear driving sets. The universal wheel 7 is disposed on a bottom of the body frame 1, and the universal wheel 7 and the two drive wheels 6 are distributed in a triangular shape.

The drive motor set 4 includes the two drive motors and the two gear driving sets, the two gear driving sets are used in conjunction with the two drive motors. The two drive motors in the drive motor set 4 are configured to respectively supply driving power for the two driving wheels 6. Each of the driving wheels 6 is disposed between one of the gear driving shafts 5. The two gear driving shafts 5 are respectively connected with the two gear driving sets. Power of the two driving motors is respectively delivered to the two driving wheels 6. The universal wheel 7 disposed on the bottom of the body frame 1 is configured to keep moving balance of the multifunctional pet feeding cart to avoid the multifunctional pet feeding cart from directly contacting with ground.

Working principles and advantages of the present disclosure are as follows.

The multifunctional pet feeding cart has multiple control modes, when the power switch 8 is pressed, a main power of the multifunctional pet feeding cart is turned on. When the power switch 8 is pressed again, the multifunctional pet feeding cart enters a network connecting mode. At this time, the users control the multifunctional pet feeding cart by the wireless local area network and mobile phone software and watch the views shooted by the camera 11. When the users press the power switch 8 three times in succession, the multifunctional pet feeding cart enters a BLUETOOTH pairing mode, at this time, the users control the multifunctional pet feeding cart by mobile phone BLUETOOTH and the mobile phone software and watch the views shooted by the camera 11. When the users press the power switch 8 four times in succession, the multifunctional pet feeding cart enters a remote control mode, at this time, the users control the multifunctional pet feeding cart by the remote controller. When the power switch 8 is long pressed, the main power of the multifunctional pet feeding cart is turned off.

When a control mode is selected, the multifunctional pet feeding cart is ready to use. Before using the intelligent pet feeding cart, the cover opening locking buckle 23 is unlocked to open the bin cover 24, the pet feed is put into the feeding bin 20 disposed on the surface shell 19, and then the bin cover 24 is closed to start an automatic control mode of the multifunctional pet feeding cart by the remote controller or the mobile terminal like the mobile phone. When the control mainboard 2 receives a signal sent by the remote controller or the mobile terminal, the control mainboard 2 controls the drive motor set 4 to start, the drive motor set 4 drives the two driving wheels 6 to rotate by the gear driving shafts 5, so that the multifunctional pet feeding cart does irregular motion according to a preset program. When the infrared sensors 10 disposed on the front shell 9 detects that there are obstacles in front of a motion track of the intelligent pet feeding cart, the infrared sensors 10 returns related signals to the control mainboard 2. The control main board 2 controls the two drive motors in the drive motor set 4 to rotate in different speeds, so that the intelligent pet feeding cart automatically turns to avoid the obstacles. Meanwhile, the users start the infrared lamps 12 by the remote controller or the mobile terminal, and the infrared lamps 12 emit light rays to attract the attention of the pets, then the pets chase the multifunctional pet feeding cart. Meanwhile, the infrared lamps 12 are further configured to light, which helps the camera 11 shoot clear views at night or under a condition of insufficient light. The users further control the feeding assembly by the remote controller or the mobile terminal to put the pet feed into different positions. In this process, when the control mainboard 2 receives a signal sent by the remote controller, then the control mainboard 2 controls the feeding motor 14 to start. The output shaft of the feeding motor 14 simultaneously drives the food-delivering component 18 and the food-outputting component 17 to rotate. The food-delivering component pushes the pet feed in the feeding bin 20 from the feeding opening 25, then the pet feed enters the rough 15. The food-outputting component 17 pushes the pet feed out of the rough 15 and then the pet feed enters the feeding channel 16. The feeding channel 16 delivers the pet feed to the pets to eat. The users or the pets further manually press the bin cover 24, and the bin cover is pressed to touch the feeding button 22. The feeding button 22 is used in conjunction with the feeding circuit board 21, the feeding signal is transmitted to the control mainboard 2, then the feeding assembly executes the above feeding process to achieve a manual feeding operation of the users and an operation of the pets catch the intelligent pet feeding cart and eat the pet feed themselves.

The users further manually control the motion track of the multifunctional pet feeding cart by the remote controller and the mobile terminal. At same time, the users watch the views shooted by the camera 11 by operating the mobile terminal, thus, the users know what the pets are doing at any time.

The multifunctional pet feeding cart is controlled to operate by the multifunctional control module, thus, there are multiple control methods to control the multifunctional pet feeding cart. The multifunctional pet feeding cart stirs pet feed by the feeding assembly and feeds pets in small amounts and multiple times. The multifunctional pet feeding cart is further driven by the drive assembly and the multifunctional control assembly and then keeps interacting with the pets. Users monitor motions of pets at any time and are convenient to remotely control the multifunctional pet feeding cart by the camera module, and then feed the pets. Thus, the pets have enough exercise and more easily eat up the pet feed in the intelligent pet feeding cart, which greatly decreases a risk of food waste.

The foregoing is merely an embodiment of the present disclosure. The specific structures and characteristics that are well known in the art, and the like, of this embodiment, are not described in detail herein. It will be appreciated by those of ordinary skill in the art that prior to the filing date or priority of the present application, all of the ordinary skill in the art can know all of the prior art in this field and have the ability to apply the conventional experimental means before the date, and one of ordinary skill in the art can refine and implement the present scheme in conjunction with its own capabilities in light of the teachings presented herein. Some typical well-known structures or well-known methods should not be an obstacle to practicing the present disclosure by one of ordinary skill in the art. It should be noted that several variations and modifications may be made to those skilled in the art without departing from the structure of the present disclosure, which should also be taken as the scope of protection of the present disclosure and do not affect the effectiveness and applicability of the practice of the invention. The scope of the invention should be set forth with reference to the claims, rather than the foregoing description of specific embodiments, which may be used to explain the contents of the claims.

What is claimed is:

1. A multifunctional pet feeding cart, comprising:

a body assembly;

a feeding assembly;

a multifunctional control assembly;

a drive assembly; and a camera assembly;

wherein the feeding assembly, the multifunctional control assembly, the drive assembly, and the camera assembly are disposed inside the body assembly, and the multifunctional control assembly is respectively and electrically connected with the feeding assembly, the drive assembly, and the camera assembly;

the multifunctional control assembly comprises a multifunctional control module and an identification module; the multifunctional control module is electrically connected with the identification module; the multifunctional control module comprises a control mainboard, a battery, a power switch, a feeding circuit board, a card slot, and a charging connector;

the battery, the power switch, the feeding circuit board, the card slot, and the charging connector are electrically connected with the control mainboard;

a mobile network module, a first wireless network module, a second wireless network module, an infrared remote module, and a charging circuit module are integrated on the control mainboard;

the card slot is disposed on the mobile network module;

the charging connector is electrically connected with the charging circuit module;

the camera assembly comprises a connecting circuit board, a camera, and a plurality of infrared lamps; the camera is disposed on the connecting circuit board, and the plurality of the infrared lamps are disposed around the camera;

the connecting circuit board is electrically connected with the control mainboard;

the body assembly comprises a body frame, a front shell, a surface shell, a bin cover, and a cover opening locking buckle;

the surface shell is disposed on the body frame, and the body frame is fixedly connected with the front shell; the feeding bin is disposed on the surface shell; the surface shell is hinged to the bin cover, and the bin cover is located above the feeding bin;

the cover opening locking buckle is disposed on the surface shell, and the cover opening locking buckle is buckled with a buckle disposed on the bin cover; and a lens is disposed on the surface shell, and the lens is coordinated and matched with a position where the camera and the plurality of the infrared lamps are disposed.

2. The multifunctional pet feeding cart according to claim 1, wherein the identification module comprises two infrared sensors configured to detect obstacles, the two infrared sensors are electrically connected with the control mainboard and are symmetrically disposed on the front shell.

3. The multifunctional pet feeding cart according to claim 1, wherein the control mainboard is disposed inside the body frame; the power switch, the card slot, and the charging connector are disposed on an outer wall of the body frame, the feeding circuit board is disposed on an inner wall of the surface shell, and the feeding circuit board is connected with a feeding button; the feeding button is disposed on the surface shell and is disposed below the cover bin.

4. The multifunctional pet feeding cart according to claim 1, the feeding assembly comprising:

a feeding motor;

a trough;

a feeding channel;

a food-outputting component;

a food-delivering component; and a feeding bin;

the trough is disposed inside the body frame and the feeding motor is fixedly disposed on a bottom of the trough;

an output shaft of the feeding motor is inserted into the trough, the output shaft of the feeding motor is connected with the food-outputting component by a button, and the food-outputting component is located inside the trough;

the output shaft of the feeding motor is connected with the food-delivering component by a button, and the food-delivering component is located above the food-outputting component;

the food-delivering component is located inside the feeding bin, and the feeding bin is located directly above the trough; the food-outputting component is located below the feeding bin; and a food-outputting opening is disposed on a bottom of the feeding bin.

5. The multifunctional pet feeding cart according to claim 1, wherein the food-delivering component is composed of two food-pushing plates, an angle formed by any one of the two food-pushing plates and the bottom of the feeding bin is an acute angle.

6. The multifunctional pet feeding cart according to claim 5, wherein the food-outputting component is composed of a plurality of food-scraping plates, the plurality of the food-scraping plates evenly surround the output shaft of the feeding motor; the food-scraping plates are perpendicular to and distributed on the bottom of the trough.

7. The multifunctional pet feeding cart according to claim 5, wherein the drive assembly comprising:

a drive motor set;

two gear driving shafts;

two drive wheels; and a universal wheel;

the drive motor set is disposed inside the body frame and the drive motor set comprises two drive motors and two gear driving sets, the two drive motors are connected with the two gear driving sets;

the two drive wheels are respectively disposed on two sides of the body frame and the two drive wheels are connected with the body frame by the gear driving shafts;

the gear driving shafts are rotatably connected with the body frame and the gear driving shafts are in meshing connection with the gear driving sets; and the universal wheel is disposed on a bottom of the body frame, and the universal wheel and the two drive wheels are distributed in a triangular shape.

* * * * *